US012459568B2

(12) United States Patent
Cornolti et al.

(10) Patent No.: US 12,459,568 B2
(45) Date of Patent: Nov. 4, 2025

(54) HYDROSTATIC TRACTION DRIVE FOR A LATERALLY-STEERED VEHICLE AND HYDROSTATIC DRIVE FOR A LATERALLY-STEERED MOBILE WORK MACHINE

(71) Applicant: Robert Bosch GmbH, Stuttgart (DE)

(72) Inventors: Diego Cornolti, Bergamo (IT); Erguen Goekce, Nersingen (DE); Giovanni Belloni, Giengen an der Brenz (DE); Karl-Heinz Vogl, Ummendorf (DE); Michael Brand, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 643 days.

(21) Appl. No.: 17/813,243

(22) Filed: Jul. 18, 2022

(65) Prior Publication Data
US 2023/0032780 A1 Feb. 2, 2023

(30) Foreign Application Priority Data
Jul. 28, 2021 (DE) ...................... 10 2021 208 118.5

(51) Int. Cl.
*B62D 11/00* (2006.01)
*B62D 11/10* (2006.01)
(Continued)

(52) U.S. Cl.
CPC ............ *B62D 11/005* (2013.01); *B62D 11/10* (2013.01); *F16H 61/47* (2013.01); *F16H 61/472* (2013.01); *F16H 39/40* (2013.01)

(58) Field of Classification Search
CPC ..... B60Y 2400/85; B62D 11/10; E02F 9/225; F16H 61/47; F16H 61/472; F16H 61/40; F16H 61/44; F16H 61/46
See application file for complete search history.

(56) References Cited

U.S. PATENT DOCUMENTS 4,399,886 A * 8/1983 Pollman ................ F16H 61/46
180/242
5,042,251 A * 8/1991 Berthold ............... F16H 61/431
60/489
(Continued)

FOREIGN PATENT DOCUMENTS

CN 112424486 A * 2/2021 ........... B62D 11/005
DE 102016209357 A1 * 11/2017
EP 0 305 761 A2 3/1989

OTHER PUBLICATIONS

Findeisen, Dietmar: Ölhydraulik—Handbuch für die hydrostatische Leistungsübertragung in der Fluidtechnik. 5th ed., Springer Berlin, Heidelberg, 2006, p. 25.
(Continued)

Primary Examiner — Thomas E Lazo
(74) Attorney, Agent, or Firm — Maginot, Moore & Beck LLP

(57) ABSTRACT

A hydrostatic traction drive has a steering function, which is implemented via two laterally acting secondary units (traction motors), which are supplied by a common primary unit (pump) in the open circuit. The primary unit is pressure-controlled. The two secondary units are torque-controlled. The affected vehicle is steerable as a function of a steering command by different torque specifications for the two secondary units. Furthermore, a hydrostatic drive for a mobile work machine has working hydraulics in addition to the traction drive. The working hydraulics are also supplied by the primary unit in parallel to the two secondary units.

13 Claims, 4 Drawing Sheets

(51) Int. Cl.
*F16H 61/47* (2010.01)
*F16H 61/472* (2010.01)
*F16H 39/40* (2006.01)

(56) References Cited

U.S. PATENT DOCUMENTS

| | | | | |
|---|---|---|---|---|
| 6,135,231 | A * | 10/2000 | Reed | B60K 28/165 |
| | | | | 180/6.48 |
| 8,751,132 | B2 * | 6/2014 | Grepl | B60K 17/356 |
| | | | | 180/242 |
| 2009/0038186 | A1 * | 2/2009 | Osswald | B62D 49/085 |
| | | | | 37/468 |
| 2013/0133319 | A1 * | 5/2013 | Lacher | F16H 61/421 |
| | | | | 60/327 |
| 2016/0144893 | A1 * | 5/2016 | Wiertellok | F16H 61/456 |
| | | | | 60/427 |
| 2019/0359257 | A1 * | 11/2019 | Johnson | B62D 55/06 |

OTHER PUBLICATIONS

Kordak, R.: "Hydrostatic Drives with Control of the Secondary Unit," The Hydraulic Trainer, vol. 6, Mannesmann Rexroth GmbH, Lohr am Main, 1996, pp. 30-31.

* cited by examiner

HYDROSTATIC TRACTION DRIVE FOR A LATERALLY-STEERED VEHICLE AND HYDROSTATIC DRIVE FOR A LATERALLY-STEERED MOBILE WORK MACHINE

This application claims priority under 35 U.S.C. § 119 to application no. DE 10 2021 208 118.5, filed on Jul. 28, 2021 in Germany, the disclosure of which is incorporated herein by reference in its entirety.

The disclosure relates to a hydrostatic traction drive for a laterally-steered vehicle, in particular a tracked vehicle. The disclosure furthermore relates to a hydrostatic drive for a laterally-steered mobile work machine, e.g., a crawler excavator, a CTL, or a skid steer loader having such a traction drive and having further hydrostatic consumers.

BACKGROUND

Hydrostatic traction drives are known from the prior art, the hydrostatic primary and secondary units of which are connected to one another via an open circuit. The open circuit only has one working line used as a high-pressure line here, which connects the two units to one another. Furthermore, both units are each connected to a shared tank.

It is known from the literature that in traction drives in the open circuit, hydraulic accumulators are necessary to stabilize or decouple the pressure regulation and be able to regulate the torque by regulating the displacement and then to be able to regulate the rotational speed at the secondary unit superimposed thereon. The working pressure is affected by the state of charge of the hydraulic accumulator. It is disadvantageous that the working pressure can only be set variably in limits and the traction drive is not efficiency optimal.

In the publication Korak, Dipl.-Ing. R.: Hydrostatische Antriebe mit Sekundärregelung—Der Hydraulik Trainer [hydrostatic drives having secondary regulation—the hydraulic trainer], volume 6, Mannesmann Rexroth GmbH, 1996, a constant pressure system having a secondary-regulated unit is disclosed. Such a hydraulic accumulator is connected to the working line.

In the publication Findeisen, Dietmar: Ölhydraulik [oil hydraulics], 2006, Springer-Verlag Berlin, Heidelberg, a traction drive having an open circuit is described, to the working line of which a hydraulic accumulator is connected. The primary unit is pressure-controlled and the secondary unit is speed-controlled.

Document EP 0 305 761 A2 discloses a traction drive in the open circuit without hydraulic accumulator. The primary unit has a hydro-mechanical pressure-flow rate regulator, which sets a constant work pressure (250 bar).

Such hydrostatic traction drives in the open circuit have the disadvantage that they do not provide a steering function for the affected vehicle.

In contrast, the disclosure is based on the object of providing a hydrostatic traction drive which provides a steering function for the affected vehicle. Furthermore, the disclosure is based on the object of providing a hydrostatic drive for a mobile work machine which provides a steering function, and which furthermore supplies working hydraulics.

SUMMARY

This object is achieved with respect to the traction drive described herein.

The hydrostatic traction drive according to the disclosure is used to drive a vehicle, wherein the traction drive has a left secondary unit and a right secondary unit, which are designed as hydrostatic adjustable and through-pivotable axial piston machines, and which can be supplied by a shared hydrostatic adjustable primary unit via an open hydrostatic circuit. The primary unit is pressure-controlled, while the two secondary units are torque-controlled. According to the disclosure, the traction drive has a steering function (track steering, skid steer) for the vehicle, due to which it is a laterally-steered vehicle. The steering function is implemented via an unequal or separated torque regulation of the two secondary units.

The left secondary unit is to be understood as that secondary unit which is coupled to a left drive unit, for example, a left track or to left wheels of the laterally-steered vehicle. The right secondary unit is to be understood as that secondary unit which is coupled to a right drive unit, for example, a right track or to right wheels of the laterally-steered vehicle.

In the traction drive, the primary unit is a pump and the two secondary units are motors. Using the traction drive according to the disclosure, it is possible to implement lateral steering even in the open circuit without hydraulic accumulator. The traction drive is simple with respect to device technology, thus only one high-pressure resistant line and only one pressure-resistant fitting at each of the three units are necessary. A braking mode is also possible via a pivotability of the two secondary units without modulated brake valves. The traction drive according to the disclosure is flexibly usable and has a high efficiency at the same time.

The vehicle equipped with the traction drive according to the disclosure can be a tank or a snow cat or a mobile work machine, for example, a skid steer loader.

In one particularly preferred refinement, a setpoint torque for each secondary unit is ascertained from a driving command of at least one operating element (for example, a joystick or accelerator pedal) and from a steering command of at least one steering element (for example, a joystick or steering wheel).

In one particularly preferred refinement, initially an overall setpoint torque is ascertained from the driving command and from the respective actual rotational speeds of the two secondary units. This module can be called "target torque planner".

The signal of a travel direction switch is preferably also taken into consideration in the ascertainment of the overall setpoint torque.

In one exemplary embodiment, a travel speed is ascertained from the respective actual rotational speeds of the two secondary units, and the driving command is ascertained from a position of the accelerator pedal. The overall setpoint torque is ascertained via a characteristic map from the driving speed and from the position of the accelerator pedal.

The overall setpoint torque can be decreased to a reduced setpoint torque as a function of a current torque and an actual rotational speed and a setpoint rotational speed of a drive machine. The corresponding module can be called "limiting load regulator". If the drive machine coupled to the primary unit is a diesel engine, a diesel depression can thus be prevented.

In one particularly preferred refinement of the traction drive according to the disclosure, the setpoint torque of the left secondary unit and the setpoint torque of the right secondary unit are ascertained from the overall setpoint torque or the reduced setpoint torque and furthermore from the steering command. This module can be called "Torque distribution: steering pre control".

In one particularly preferred refinement, the respective setpoint torques of the two secondary units are pilot control components. A closed regulator then calculates two torque components from a setpoint rotational speed ratio and an actual rotational speed ratio of the two secondary units, which are added to the respective pilot control component to thus determine two final torque specifications. This module can be called "Speed ratio feedback control".

The following two exemplary embodiments are preferred in the final ascertainment of the respective setpoint pivot angle of the two secondary units:

According to a first exemplary embodiment, the setpoint pivot angle is ascertained from the two setpoint torques and from a measured actual pressure or a setpoint pressure.

According to a second exemplary embodiment, the setpoint pivot angle is ascertained from the two final torque specifications and from the measured actual pressure or a setpoint pressure. This module can be called "Torque generation".

The hydrostatic drive according to the disclosure is designed for a mobile work machine and has an above-described traction drive having steering function and furthermore at least one hydrostatic consumer, which can be supplied via a valve assembly. At least one consumer supplied via the valve assembly forms the working hydraulics, which are arranged in parallel to the two secondary units in the open hydrostatic circuit and can be supplied by the primary unit.

Using the drive according to the disclosure, it is possible to implement a lateral steering function in the open circuit without hydraulic accumulator and to supply working hydraulics. The drive is simple with respect to the device, only one branched high-pressure resistant line and only one pressure-resistant fitting for each of the three units are thus necessary. No further pump or primary unit is necessary for the working hydraulics. The drive according to the disclosure is flexibly usable and has high efficiency at the same time.

In one energy-saving refinement, the hydrostatic drive has a load sensing system, which as the setpoint pressure of the pressure regulation of the primary unit ascertains the highest pressure from a group, wherein the group includes at least one current load pressure of the at least one consumer of the working hydraulics plus a pressure differential value and wherein the group furthermore contains a pressure derived from a driving command of at least one operating element (for example, joystick or accelerator pedal).

BRIEF DESCRIPTION OF THE DRAWINGS

One exemplary embodiment of the hydrostatic traction drive according to the disclosure having steering function is illustrated in the figures.

In the Figures

DETAILED DESCRIPTION

Figure 1:
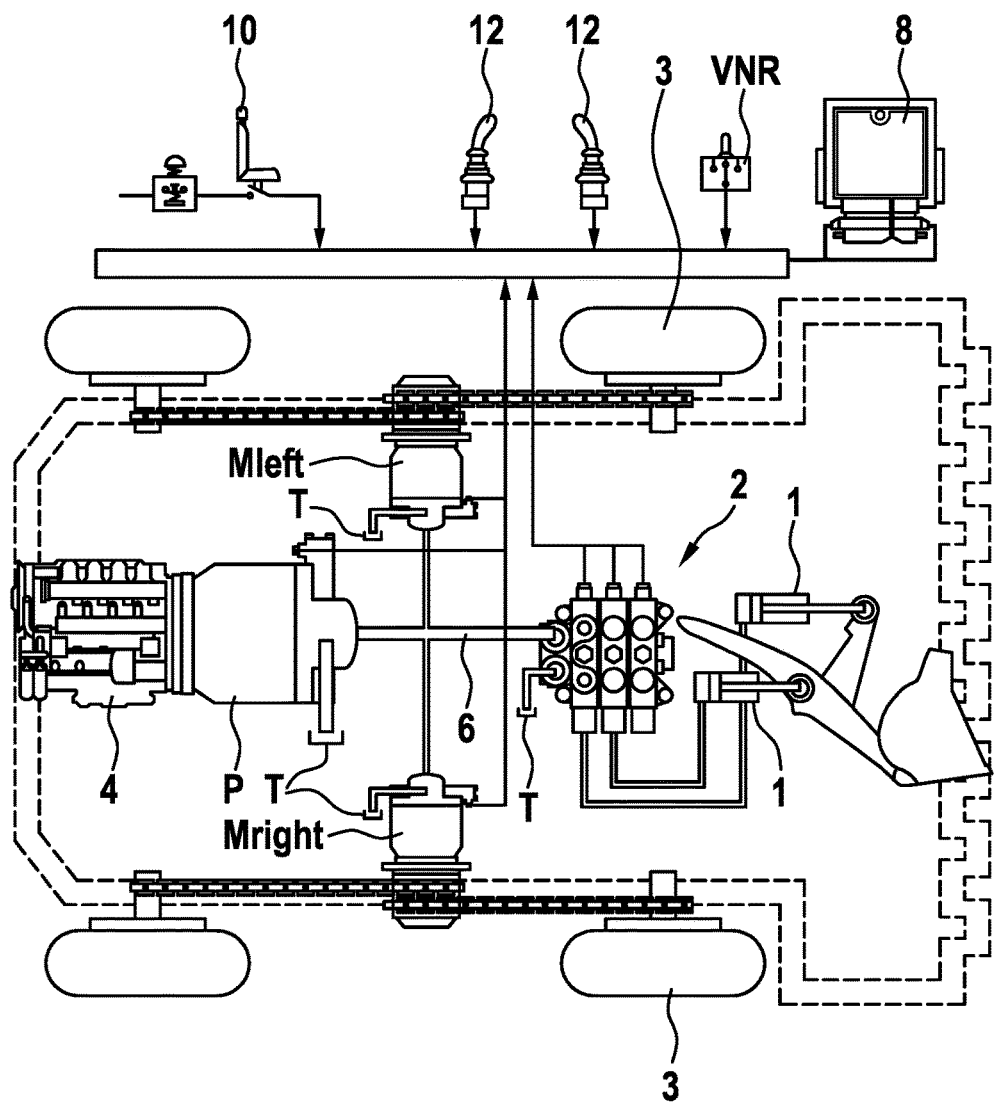
FIG. 1 shows a mobile work machine having the exemplary embodiment of the hydrostatic traction drive according to the disclosure having steering function in a simplified illustration.

FIG. 1 shows a mobile work machine which is designed as a skid steer loader. It has a hydrostatic drive, which comprises the exemplary embodiment of the hydrostatic traction drive according to the disclosure having steering function for its four wheels 3. Furthermore, the drive comprises working hydraulics, which consists in the exemplary embodiment shown of two consumers 1 and a valve assembly 2, which is designed as a valve block having at least two valves for controlling the two consumers 1.

A hydrostatic primary unit P, which is designed as an adjustable axial piston machine, is driven by a drive machine 4, which is designed in the exemplary embodiment shown as an internal combustion engine. A left secondary unit Mleft and a right secondary unit Mright and the valve assembly 2 are supplied by the primary unit P via a branched working line 6. The two secondary units Mleft, Mright are designed as adjustable and through-pivotable axial piston units, which are used in the driving mode as traction motors. For this purpose, the left secondary unit Mleft is coupled in a rotationally-fixed manner to the two left wheels 3, while the right secondary unit Mright is coupled in a rotationally-fixed manner to the two right wheels 3. The four wheels 3 are not pivotable out of the position shown in FIG. 1. Instead, the two wheels 3 of one side are driven faster than the two wheels 3 of the other side to steer the mobile work machine. It is also possible that the two wheels 3 of one side are driven forward and the secondary unit Mleft, Mright of the other side is pivoted through, so that the two wheels 3 of the other side are driven in reverse. The mobile work machine can thus rotate around its vertical axis.

The hydrostatic drive is controlled via an electronic control unit 8, which is in a signal connection on the operator side with an accelerator pedal 10 and a travel direction switch VNR and two joysticks 12. Furthermore, the electronic control unit 8 is in a signal connection with the three units P, Mleft, Mright and with the valves of the valve assembly 2.

Figure 2:
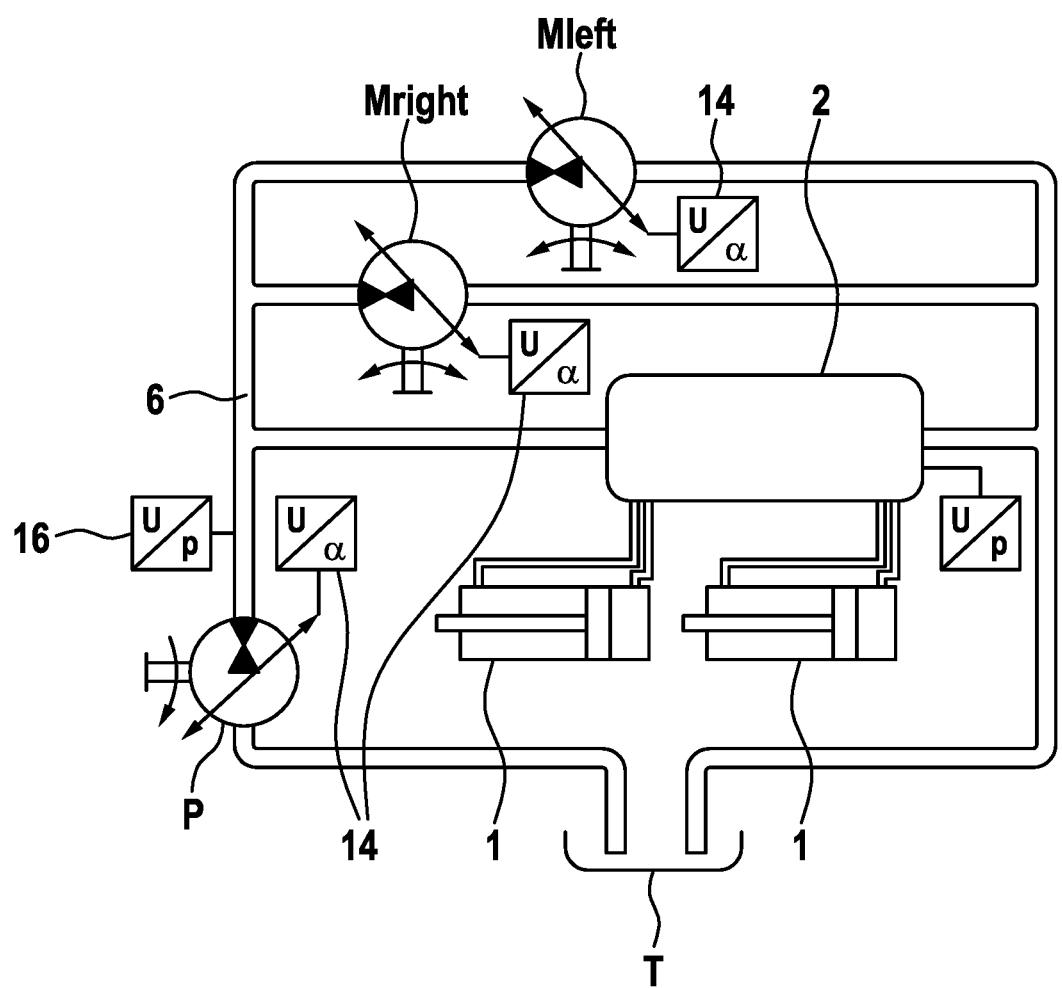
FIG. 2 shows a simplified hydraulic circuit diagram of the exemplary embodiment of the hydrostatic traction drive from FIG. 1.

FIG. 2 shows a simplified hydraulic circuit diagram of the exemplary embodiment of the hydrostatic drive from FIG. 1. It is shown that a high-pressure fitting of the primary unit P is connected via the triple-branched working line 6 to the high-pressure fittings of the two secondary units Mleft, Mright and the valve assembly 2. On the low-pressure side, the two secondary units Mleft, Mright and the valve assembly 2 are connected via a shared branched tank line to the tank T.

Furthermore, respective pivot angle sensors 14 are arranged at the three units P, Mleft, Mright. A pressure sensor 16 is accordingly provided at the primary unit P, which is pressure-regulated according to the disclosure.

Figure 3:
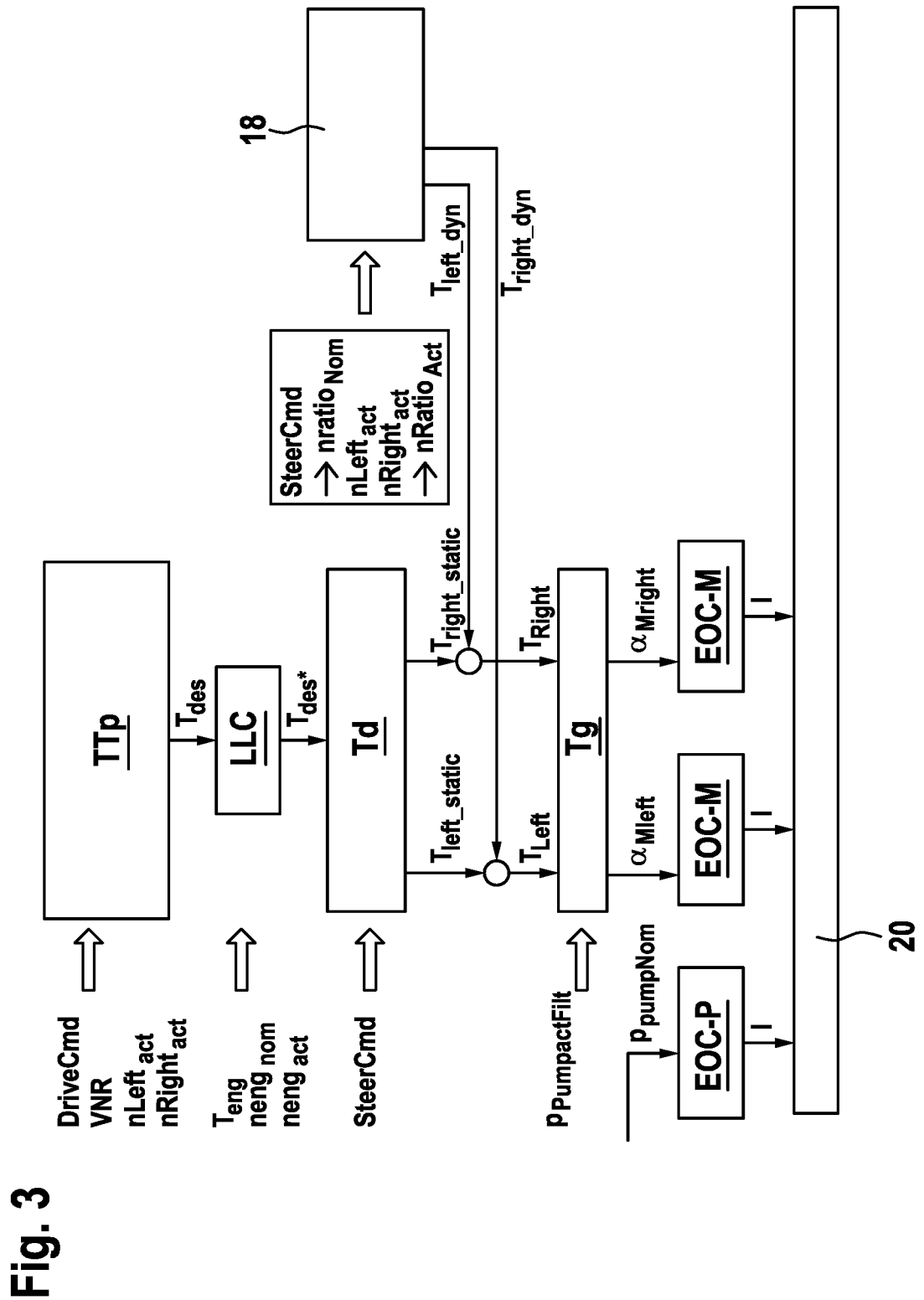
FIG. 3 shows a diagram of the signal sequence of the exemplary embodiment of the hydrostatic traction drive.

FIG. 3 shows a diagram of the signal sequence of the exemplary embodiment of the hydrostatic traction drive of the hydrostatic drive from the two preceding figures. The module "Target-Torque-Planner" TTp has as the input the driving command DriveCmd, which corresponds to the position of the accelerator pedal 10, the selection of the travel direction switch VNR, and the measured actual rotational speeds nLeft$_{act}$, nRight$_{act}$ of the two secondary units Mleft, Mright.

Figure 4:
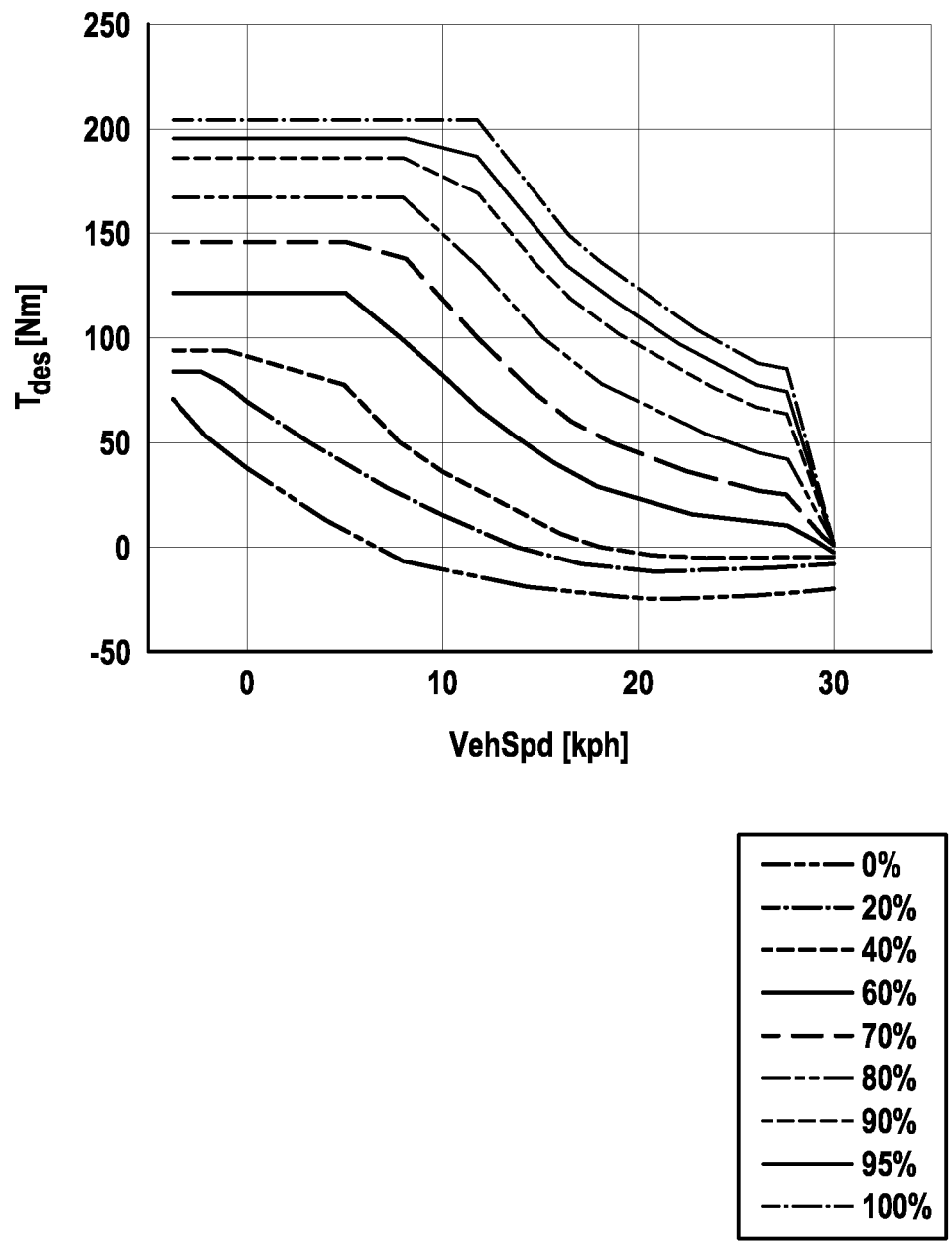
FIG. 4 shows a characteristic map of the exemplary embodiment of the hydrostatic traction drive.

The output variable of the module "Target-Torque-Planner" TTp corresponds to a setpoint torque T$_{des}$, which is ascertained from the characteristic map according to FIG. 4 as a function of the average travel speed VehSpd and the position of the accelerator pedal 10. The average travel speed VehSpd is calculated from the actual rotational speeds nLeft$_{act}$, nRight$_{act}$. With the aid of the travel direction switch VNR, the sign of the setpoint torque T$_{des}$ may be determined, for example, positive for forward travel, negative for reverse travel.

This setpoint torque T$_{des}$ is limited in the second step in a limiting load controller LLC to a smaller value T$_{des*}$ if an overload situation of the drive machine 4 (internal combustion engine or electric motor) driving the primary unit P occurs on the primary side. The overload situation can arise, for example, due to a reduction of the primary-side input power (for example, air conditioner is switched on) or hydraulic consumer 1 of the working hydraulics is activated. The limiting load controller LLC has as the input the current torque T$_{eng}$ and the setpoint rotational speed neng$_{nom}$ and the actual rotational speed neng$_{act}$ of the drive machine 4.

In the next step, the calculation of the setpoint torque distribution between the left and the right secondary units Mleft, Mright takes place. The two setpoint torques T$_{Left\_static}$, T$_{Right\_static}$ correspond to a pilot control of the setpoint torques based on the steering command SteerCmd, which is transmitted from the joysticks 12 (or also from a steering wheel). The steering command SteerCmd may be interpreted as a setpoint rotational speed ratio nRatio$_{Nom}$, since the curve radius of the mobile work machine is proportional to the rotational speed ratio nRatio between the left rotational speed nLeft and the right rotational speed nRight or between the inner rotational speed and the outer rotational speed.

Since the pilot control is never exact due to disturbances and errors in the module assumptions, these inaccuracies are regulated out in the module "Speed-Ratio-Feedback-Control" 18 in the closed control loop. As the input, the steering command SteerCmd is again entered, from which the setpoint rotational speed ratio nratio$_{Nom}$ is ascertained, and the actual rotational speed ratio nRatio$_{Act}$ is entered, which is calculated from the two actual rotational speeds nLeft$_{act}$, nRight$_{act}$. These two torque components T$_{left\_dyn}$, T$_{right\_dyn}$ are added to the respective pilot control components T$_{Left\_static}$, T$_{Right\_static}$ to thus determine the two final torque specifications T$_{Left}$, T$_{Right}$.

Using the two final torque specifications T$_{Left}$, T$_{Right}$ and with the aid of the measured actual pressure p$_{PumpActFilt}$ (or alternatively the setpoint pressure p$_{PumpNom}$), in the module "Torque-Generation" TG, the two pivot angle specifications or setpoint pivot angles α$_{Mleft}$, α$_{Mright}$ are calculated. This takes place via the known relationship $$T = \alpha * Vg \text{ Max} * p/20\pi.$$

The setpoint pivot angles α$_{Mleft}$, α$_{Mright}$ are transmitted to the drivers EOC-M of the two secondary units Mleft, Mright.

The drivers EOC-M of the two secondary units Mleft, Mright and a driver EOC-P of the primary unit P each output a control current I for the models 20.

FIG. 4 shows the way in which the ascertainment of the overall setpoint torque T$_{des}$ takes place. In the module "Target Torque planner" TTp, the characteristic map shown is stored, which ascertains as a function of the current travel speed VehSpd [kph] and the accelerator pedal position, which is possible from 0 to 100%, and is shown in characteristic curves each having 20% difference, the overall setpoint torque T$_{des}$ [Nm].

A hydrostatic traction drive having a steering function is disclosed, which is implemented via two laterally acting secondary units (traction motors) Mleft, Mright, which are supplied in the open circuit by a common primary unit (pump) P. The primary unit P is pressure-controlled. The two secondary units Mleft, Mright are torque-controlled. The affected vehicle is steerable as a function of a steering command SteerCmd by different torque specifications for the two secondary units Mleft, Mright.

Furthermore, a hydrostatic drive for a mobile work machine is disclosed, wherein the drive also has working hydraulics in addition to the traction drive. These are also supplied by the primary unit P in parallel to the two secondary units Mleft, Mright.

LIST OF REFERENCE SIGNS

1 consumer
2 valve assembly
3 wheel
4 drive machine
6 working line
8 electronic control unit
10 accelerator pedal
12 joystick
14 pivot angle sensor
16 pressure sensor
18 module "Speed-Ratio-Feedback-Control"
20 models
α$_{Mleft}$ setpoint pivot angle of the left secondary unit
α$_{Mright}$ setpoint pivot angle of the right secondary unit
delta-p pressure differential value
DriveCmd driving command
EOC-P drivers of the primary unit
EOC-M drivers of the secondary unit
I control current
LLC limiting load regulator
Mleft left secondary unit (motor)
Mright right secondary unit (motor)
neng$_{act}$ actual rotational speed of the drive machine
neng$_{nom}$ setpoint rotational speed of the drive machine
nLeftact actual rotational speed of the left secondary unit
nRightact actual rotational speed of the right secondary unit
nratio$_{Nom}$ setpoint rotational speed ratio of the two secondary units
nRatio$_{Act}$ actual rotational speed ratio of the two secondary units
P primary unit (pump)
p$_{PumpActFilt}$ actual pressure
p$_{PumpNom}$ setpoint pressure
p$_{Pump}$ pressure of the group
p$_{LSWork}$ load pressure
SteerCmd steering command
TTp module "Target Torque planner"
T$_{left\_static}$ setpoint torque of the left secondary unit
T$_{right\_static}$ setpoint torque of the right secondary unit
T$_{left\_dyn}$ torque component of the left secondary unit
T$_{right\_dyn}$n torque component of the right secondary unit
T$_{Left}$ final torque specification of the left secondary unit
T$_{Right}$ final torque specification of the right secondary unit
T$_{des}$ overall setpoint torque (of the traction drive)
T$_{des*}$ reduced setpoint torque (of the traction drive)
T$_{eng}$ current torque of the drive machine
Td module "Torque-distribution"
Tg module "Torque-Generation"
TTp module "Target-Torque-Planner"
VNR travel direction signal/travel direction switch
VehSpd travel speed

The invention claimed is:

1. A hydrostatic traction drive for a laterally-steered vehicle, comprising:
    a left secondary unit;
    a right secondary unit, the left and right secondary units configured as hydrostatic adjustable and through-pivotable axial piston machines; and
    a common hydrostatic adjustable primary unit configured to supply the left and right secondary units via an open hydrostatic circuit,
    wherein the primary unit is pressure-controlled, while the left and right secondary units are torque-controlled, and
    wherein the traction drive has a steering function for the vehicle, which is implemented via unequal or separate control of the torque of the left and right secondary units.

2. The hydrostatic traction drive according to claim 1, wherein the traction drive is configured to determine a first setpoint torque of the left secondary unit and a second setpoint torque of the right secondary unit from a driving command of at least one operating element and from a steering command of at least one steering element.

3. The hydrostatic traction drive according to claim 2, wherein the traction drive is further configured to determine an overall setpoint torque from the driving command and a first actual rotational speed of the left secondary unit and a second actual rotational speed of the right secondary unit.

4. The hydrostatic traction drive according to claim 3, wherein the traction drive is further configured to:
    determine a travel speed from the first and second actual rotational speeds,
    determine the driving command from a position of an accelerator pedal, and
    determine the overall setpoint torque from the travel speed and the position of the accelerator pedal using a characteristic map.

5. The hydrostatic traction drive according to claim 4, wherein the traction drive is further configured to determine the first and second setpoint torques from the overall setpoint torque and from the steering command.

6. The hydrostatic traction drive according to claim 5, wherein:
    the first and second setpoint torques are respective pilot control components, and
    the traction drive has a closed controller configured to calculate two torque components from a setpoint rotational speed ratio and an actual rotational speed ratio of the two secondary units, the two torque components being added to the respective pilot control components to determine two final torque specifications.

7. The hydrostatic traction drive according to claim 6, wherein the traction drive is further configured to determine a first setpoint pivot angle of the left secondary unit and a second setpoint pivot angle of the right secondary unit from the two final torque specifications and from a measured actual pressure or a setpoint pressure.

8. The hydrostatic traction drive according to claim 3, wherein the traction drive is further configured to decrease the overall setpoint torque to a reduced setpoint torque as a function of a current torque and an actual rotational speed and a setpoint rotational speed of a drive machine.

9. The hydrostatic traction drive according to claim 8, wherein the traction drive is further configured to determine the first and second setpoint torques from (i) the overall setpoint torque or the reduced setpoint torque and (ii) the steering command.

10. The hydrostatic traction drive according to claim 2, wherein the traction drive is further configured to determine a first setpoint pivot angle of the left secondary unit and a second setpoint pivot angle of the right secondary unit from the first and second setpoint torques and from a measured actual pressure or a setpoint pressure.

11. The hydrostatic traction drive according to claim 2, wherein the traction drive is configured to implement the unequal or separate control of the torque of the left and right secondary units based on the first and second setpoint torques.

12. A hydrostatic drive for a mobile work machine, comprising:
    a hydrostatic traction drive comprising:
        a left secondary unit;
        a right secondary unit, the left and right secondary units configured as hydrostatic adjustable and through-pivotable axial piston machines; and
        a common hydrostatic adjustable primary unit configured to supply the left and right secondary units via an open hydrostatic circuit;
        wherein the primary unit is pressure-controlled, while the left and right secondary units are torque-controlled, and
        wherein the traction drive has a steering function for the mobile work machine, which is implemented via unequal or separate control of the torque of the left and right secondary units;
    a valve assembly; and
    at least one hydrostatic consumer supplied via the valve assembly,
    wherein the at least one hydrostatic consumer and the valve assembly form working hydraulics, which are arranged in parallel to the left and right secondary units in the open hydrostatic circuit, and which are supplied by the primary unit.

13. The hydrostatic drive according to claim 12, further comprising:
    a load sensing system, which, as a setpoint pressure of the pressure control of the primary unit, determines a highest pressure from a group that includes (i) at least one current load pressure of the at least one hydrostatic consumer of the working hydraulics plus a pressure differential value, and (ii) a pressure derived from a driving command of at least one operating element.

* * * * *